United States Patent
Pathan et al.

(10) Patent No.: US 8,064,903 B2
(45) Date of Patent: Nov. 22, 2011

(54) METHODS AND APPARATUS FOR REDUCING ROAMING LATENCY IN A MOBILE NODE

(75) Inventors: Arnavkumar M. Pathan, Sunnyvale, CA (US); Patrick Pak-Chiu Leung, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 1576 days.

(21) Appl. No.: 10/749,727

(22) Filed: Dec. 30, 2003

(65) Prior Publication Data
US 2005/0148328 A1    Jul. 7, 2005

(51) Int. Cl.
H04W 4/00       (2009.01)
(52) U.S. Cl. .................. 455/432.1; 455/436; 455/441; 455/442; 455/444
(58) Field of Classification Search .......... 455/432.02, 455/435.1, 456.2, 440, 451, 449, 436, 441, 455/555, 522, 438, 432.1, 414.1, 425, 414.2, 455/415, 445, 403, 432.2, 432.3, 442, 444; 370/328, 332, 338, 500, 316; 709/208, 210
See application file for complete search history.

(56) References Cited

U.S. PATENT DOCUMENTS

| | | | |
|---|---|---|---|
| 6,184,784 B1 | 2/2001 | Shibuya | |
| 6,201,962 B1* | 3/2001 | Sturniolo et al. | 455/432.2 |
| 6,473,614 B1* | 10/2002 | Quensel et al. | 455/436 |
| 6,618,596 B1 | 9/2003 | Uchida | |
| 6,721,572 B1* | 4/2004 | Smith et al. | 455/456.1 |
| 6,791,959 B1* | 9/2004 | Palmer et al. | 370/332 |
| 7,082,114 B1* | 7/2006 | Engwer et al. | 370/331 |
| 7,106,783 B2* | 9/2006 | Seo et al. | 375/148 |
| 7,113,785 B2 | 9/2006 | Watanabe et al. | |
| 7,136,665 B2 | 11/2006 | Ida et al. | |
| 2002/0042279 A1 | 4/2002 | Da Rocha | |
| 2002/0160806 A1* | 10/2002 | Arazi et al. | 455/555 |
| 2002/0168983 A1* | 11/2002 | Kumaran et al. | 455/446 |
| 2002/0187784 A1 | 12/2002 | Tigerstedt et al. | |
| 2003/0064727 A1* | 4/2003 | Tsai et al. | 455/449 |
| 2003/0064729 A1* | 4/2003 | Yamashita | 455/451 |
| 2003/0076852 A1 | 4/2003 | Fukui | |
| 2004/0077350 A1* | 4/2004 | Naghian | 455/440 |
| 2004/0116133 A1* | 6/2004 | Kalhan et al. | 455/456.2 |
| 2004/0229612 A1* | 11/2004 | Narayanan et al. | 455/435.1 |
| 2004/0246976 A1 | 12/2004 | Balakrishnan et al. | |
| 2005/0030893 A1 | 2/2005 | Dropps et al. | |
| 2005/0043026 A1 | 2/2005 | Brok et al. | |

(Continued)

OTHER PUBLICATIONS

C. Perkins, Ed., Networking Working Group, RFC 2002 "*IP Mobility Support*", Oct. 1996.

(Continued)

*Primary Examiner* — Charles Appiah
*Assistant Examiner* — Inder Mehra
(74) *Attorney, Agent, or Firm* — Weaver Austin Villeneuve & Sampson LLP

(57) ABSTRACT

Methods and apparatus for triggering roaming in a mobile network device are disclosed. A speed of the network device is detected. One or more maximum/minimum trigger values corresponding to one or more trigger events are ascertained at the speed of the network device. One or more trigger counters associated with the one or more trigger events are maintained. Roaming of the network device is triggered when one of the trigger counters associated with one of the trigger events is equal to or exceeds (or is less than or equal to) one of the trigger values corresponding to the trigger event at the speed of the network device.

39 Claims, 5 Drawing Sheets

U.S. PATENT DOCUMENTS

2005/0048977 A1* 3/2005 Dorenbosch et al. ......... 455/441
2005/0070275 A1* 3/2005 Jeyaseelan et al. ........ 455/432.1
2005/0130662 A1* 6/2005 Murai ........................... 455/444
2006/0094460 A1* 5/2006 Tiedemann et al. .......... 455/522

OTHER PUBLICATIONS

G. Montenegro, *"Reverse Tunneling for Mobile IP,"* RFC 2344, Sun Microsystems, Inc., pp. 1-19, May 1998.

Anpalagan, Alagan S. et al: "Overlaid cellular system design with cell selection criteria for mobile wireless users," Electrical and Computer Engineering, 1999, IEEE Canadian Conference in Edmonton, Alberta, Canada May 9-12, 1999, Piscataway, NJ, USA, IEEE, US, vol. 1, May 9, 1999, ISBN: 0-7803-5579-2, pp. 24-28.

International Search Report dated Sep. 18, 2008 from corresponding PCT Application No. PCT/US04/42452, 5 pages.

Written Opinion dated Sep. 18, 2008 from corresponding PCT Application No. PCT/US04/42452, 5 pages.

"Mobile IP", Release 12.0(1)T, pp. 1-55, dated on or before Jul. 25, 2002.

CN First Office Action mailed on Mar. 22, 2010, from related CN Appl. No. 200480033529.8.

CN Second Office Action mailed on Oct. 20, 2010, from related CN Appl. No. 200480033529.8.

* cited by examiner

| Speed range | 0-1 mph | 1-3 mph | 3-10 mph | 10-30 mph |
|---|---|---|---|---|
| Max data retry count trigger value | 12 | 8 | 4 | 1 |
| Max missed beacons trigger value | 4 | 3 | 2 | 1 |
| Max data rate shift trigger value | 30 | 15 | 7.5 | 3 |
| Min signal strength trigger value | 25 | 12.5 | 6.25 | 3.125 |
|  |  |  |  |  |
|  |  |  |  |  |
|  |  |  |  |  |
|  |  |  |  |  |

*FIG. 4*

| Speed range | 0-1 mph | 1-3 mph | 3-10 mph | 10-30 mph |
|---|---|---|---|---|
| Max data retry count multiplication factor | 1 | 2/3 | 1/3 | 1/12 |
| Max missed beacons multiplication factor | 1 | 3/4 | 2/4 | 1/4 |
| Max data rate shift multiplication factor | 1 | 1/2 | 1/4 | 1/10 |
| Min signal strength multiplication factor | 1 | 1/2 | 1/4 | 1/8 |
|  |  |  |  |  |
|  |  |  |  |  |

*FIG. 5*

METHODS AND APPARATUS FOR REDUCING ROAMING LATENCY IN A MOBILE NODE

BACKGROUND OF THE INVENTION

1. Field of the Invention

The present invention relates to network technology. More particularly, the present invention relates to reducing roaming latency in a network device.

2. Description of the Related Art

Over recent years, the market for wireless communications has enjoyed tremendous growth. Hundreds of millions of people exchange information every day using pagers, cellular telephones, and other wireless communication products. With tremendous success of wireless telephony and messaging services, it is hardly surprising that wireless communication is beginning to be applied to the realm of personal and business computing. No longer bound by the harnesses of wired networks, people will be able to access and share information on a global scale nearly anywhere they venture.

Many network users, especially mobile users in businesses, the medical profession, factories, and universities, to name a few, find benefit from the added capabilities of wireless Local Area Networks (LANs). The major motivation and benefit from wireless LANs is increased mobility. Untethered by conventional network connections, network users can move about almost without restriction and access LANs from nearly anywhere. In addition to increased mobility, wireless LANs offer increased flexibility. Moreover, sometimes it is more economical to use a wireless LAN. Thus, wireless LANs offer the connectivity and the convenience of wired LANs without the need for expensive wiring or rewiring.

Various protocols have been developed to support wireless networks. As one example, IEEE 802.11 refers to a family of specifications developed by the IEEE for wireless LAN technology. IEEE 802.11 specifies an over-the-air interface between a wireless client (e.g., Mobile Node) and a base station (e.g., Access Point) or between two wireless clients.

Mobile IP is another protocol which allows laptop computers or other mobile computer units (referred to as "Mobile Nodes" herein) to roam between various sub-networks at various locations—while maintaining internet and/or WAN connectivity. Without Mobile IP or a related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the Network Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicate remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various solicitations and advertisements which form part of the Mobile IP protocol. When Mobile Node 6 engages with network segment 14, Foreign Agent 10 relays a registration request to Home Agent 8 (as indicated by the dotted line "Registration"). The Home and Foreign Agents may then negotiate the conditions of the Mobile Node's attachment to Foreign Agent 10. For example, the attachment may be limited to a period of time, such as two hours. When the negotiation is successfully completed, Home Agent 8 updates an internal "mobility binding table" which specifies the care-of address (e.g., a collocated care-of address or the Foreign Agent's IP address) in association with the identity of Mobile Node 6. Further, the Foreign Agent 10 updates an internal "visitor table" which specifies the Mobile Node address, Home Agent address, etc. In effect, the Mobile Node's home base IP address (associated with segment 12) has been shifted to the Foreign Agent's IP address (associated with segment 14).

Now, suppose that Mobile Node 6 wishes to send a message to a corresponding node 18 from its new location. A message from the Mobile Node is then packetized and forwarded through Foreign Agent 10 over the internet 4 and to corresponding node 18 (as indicated by the dotted line "packet from MN") according to a standard internet protocol. If corresponding node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from corresponding node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

As described above, a Mobile Node may roam from one Foreign Agent to another Foreign Agent. Similarly, the Mobile Node may roam from one Access Point to another Access Point. An Access Point may be defined as a point of connectivity in a wireless or non-wireless network. During roaming, the Mobile Node registers with its Home Agent to notify the Home Agent of its new location.

Specific events trigger the roaming of the mobile node to one Foreign Agent or Access Point to another Foreign Agent or Access Point when the mobile node is traveling at relatively low speed (e.g., walking speed). However, at a higher speed, these events do not trigger the roaming process quickly enough. As a result, the Foreign Agent or Access Point via which communications are received by the Mobile Node may be outside the coverage area of the Foreign Agent or Access Point. Accordingly, communications may be disrupted.

In view of the above, it would be beneficial if the roaming process could be improved to support travel of Mobile Nodes at higher speeds.

SUMMARY OF THE INVENTION

The present invention supports roaming of a mobile network device such as a Mobile Node or Mobile Router at a variety of traveling speeds. This is accomplished, in part, through detecting the speed at which the network device is traveling. In this manner, roaming may be triggered at a rate most appropriate to the speed of the network device.

In accordance with one aspect of the invention, methods and apparatus for triggering roaming in a network device are disclosed. A speed of the network device is detected (e.g. periodically) by the network device or a device associated therewith. The satisfaction of a particular trigger event triggers the roaming of the network device. Specifically, once the speed of the network device has been detected, one or more trigger values (e.g., maximum or minimum trigger values) corresponding to one or more trigger events are ascertained at the speed of the network device. For instance, trigger values may include the maximum number of beacons that can be missed by the network device before roaming is triggered. In addition, one or more trigger counters (e.g., number of beacons that have been missed) associated with the one or more trigger events are maintained by the network device. Roaming of the network device is then triggered when one of the trigger counters associated with one of the trigger events is equal to or exceeds (or, alternatively, is less than or equal to) one of the trigger values corresponding to the trigger event at the speed of the network device.

In accordance with one embodiment of the invention, the trigger values are ascertained from a profile configured at the network device. Specifically, the profile includes a set of trigger values at a plurality of different speeds or ranges of speeds. Thus, once the speed of the network device has been detected, the appropriate maximum or minimum trigger values may be ascertained.

In accordance with another aspect of the invention, a speed of the network device is detected. One or more trigger values corresponding to one or more trigger events are modified such that the one or more trigger values correspond to the speed of the network device. For instance, the trigger values may be modified using a scale factor appropriate to the speed of the network device and/or the trigger event. One or more trigger counters associated with the one or more trigger events are maintained. Roaming of the network device is then triggered when one of the trigger counters associated with one of the trigger events is equal to or exceeds (or, alternatively, is less than or equal to) one of the trigger values corresponding to the trigger event at the speed of the network device.

The embodiments of the invention may be implemented in software, hardware, or a combination of hardware and software. The invention can also be embodied as computer readable code on a computer readable medium. In addition, data structures disclosed are also part of the invention.

BRIEF DESCRIPTION OF THE DRAWINGS

FIG. 4 is an exemplary profile indicating trigger values corresponding to various speeds or speed ranges in accordance with one embodiment of the invention.

FIG. 5 is an exemplary profile indicating multiplication factors corresponding to various speeds or speed ranges, as well as trigger events, in accordance with one embodiment of the invention.

DETAILED DESCRIPTION OF THE INVENTION

In the following description, numerous specific details are set forth in order to provide a thorough understanding of the present invention. It will be apparent, however, to one skilled in the art, that the present invention may be practiced without some or all of these specific details. In other instances, well known process steps have not been described in detail in order not to unnecessarily obscure the present invention.

Embodiments of the invention support implementation of a speed sensitive mobile network device such as a Mobile Node. Through the use of a device such as a Global Positioning System (GPS), the speed of the Mobile Node may be detected. From this information, the Mobile Node may trigger roaming at a rate corresponding to the speed of the Mobile Node.

IEEE 802.11 specifies that roaming is caused by one of a plurality of roaming events. Specifically, a roaming event indicates that the Mobile Node is outside the coverage area of a particular Access Point. As a result, the Mobile Node needs to register with the New Access Point. In addition, the Mobile Node may de-register with its previous Access Point to indicate that it is no longer located at the prior Access Point. Thus, each roaming event may indicate to the Mobile Node that it needs to associate with its new Access Point so that it is within the coverage area of the new Access Point.

In addition, a roaming event may indicate that the Mobile Node is outside the coverage area of a particular Foreign Agent. Thus, the Mobile Node may register with its Home Agent via the new Foreign Agent. As a result, the Mobile Node may de-register with its Home Agent to indicate that it is no longer located at the prior Foreign Agent. Thus, each roaming event may indicate to the Mobile Node that it needs to register with its Home Agent at its new location so that it is within the coverage area of the new Foreign Agent.

Currently, the existing technology is designed to trigger roaming at low speeds (e.g., walking speed). However, today Mobile Nodes are commonly used at higher vehicular speeds. Accordingly, various embodiments of the present invention improve the roaming process at higher speeds. Specifically, various embodiments of the invention support speed sensitivity to optimize roaming at variable traveling speeds.

Generally, the trigger events use an event counter or timer. According to existing technology, when a specific trigger value has been reached or exceeded by the event counter or timer, roaming is triggered. However, these values (e.g., high values) are generally used to trigger roaming when clients are traveling at low speeds. As a result, these values (e.g., high values) inhibit faster roaming at higher speeds. Although a counter may be incremented to determine whether a specific trigger value is exceeded, it is also possible to decrement a counter to determine whether a specific trigger value has been reached.

Figure 1:
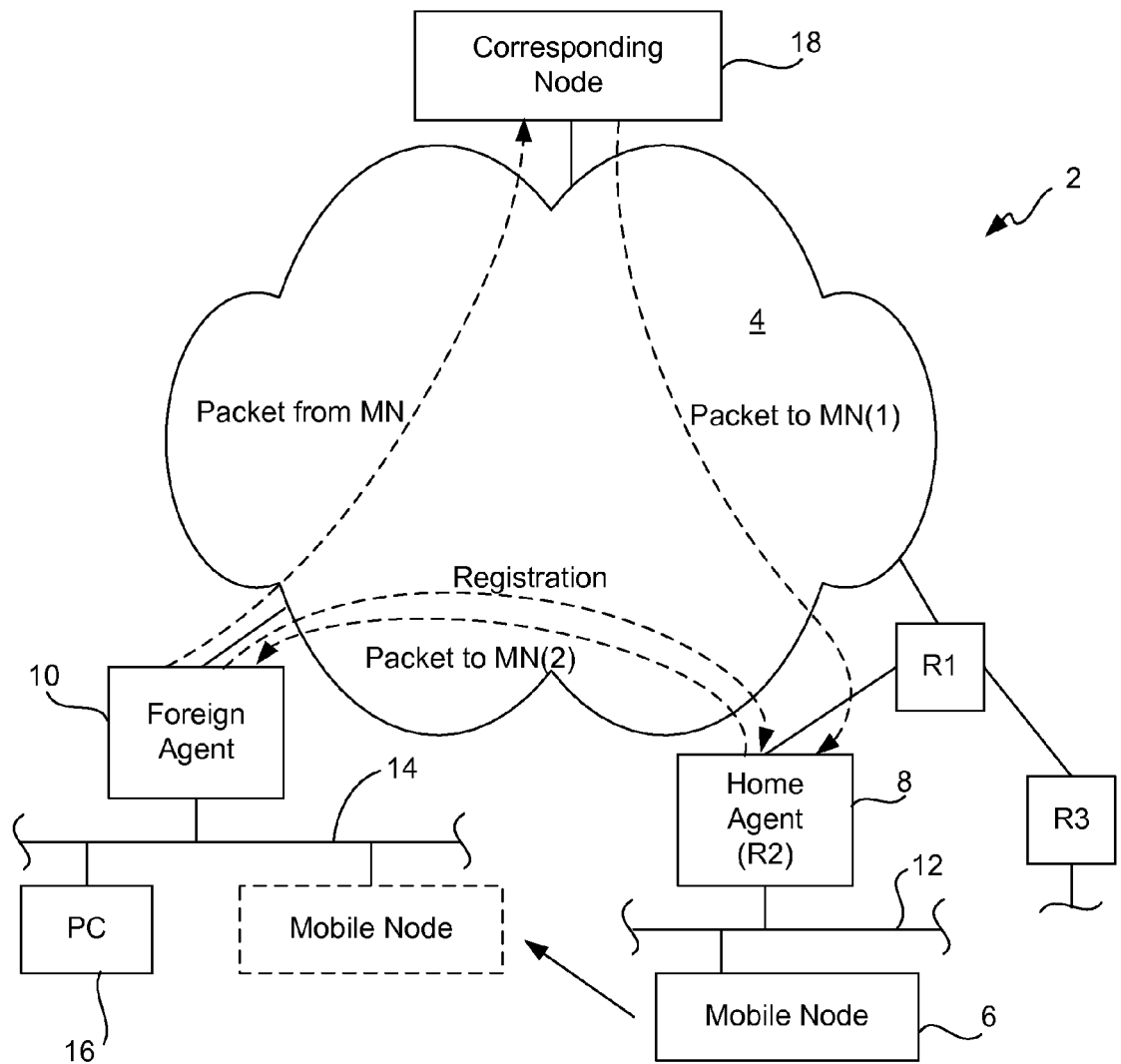
FIG. 1 is a diagram of a network segment and associated environment.
Figure 2:
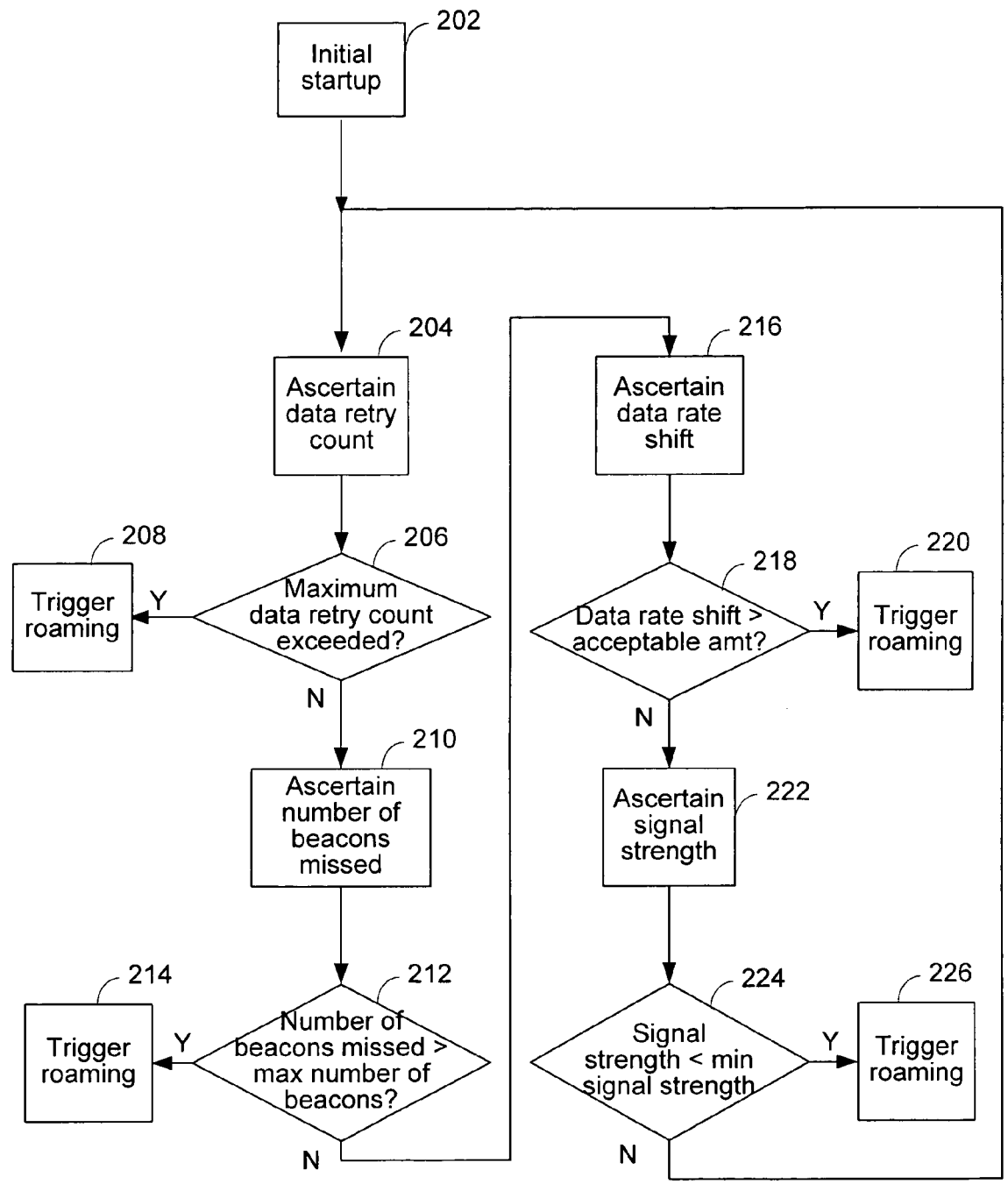
FIG. 2 is a process flow diagram illustrating a method of triggering roaming.

FIG. 2 is a process flow diagram illustrating a method of triggering roaming. Roaming may be triggered at various points during the operation of a Mobile Node. Specifically, at initial startup of the Mobile Node as shown at 202, it is possible to trigger roaming in accordance with various trigger events, as will be described in further detail below. Various trigger events may trigger roaming when one of the trigger events occurs. These events may occur individually or in combination with one another.

For instance, as shown at block 204, a data retry count trigger counter is maintained and periodically updated. Specifically, when a data packet cannot be sent by the Mobile Node, the data retry count is incremented. When the data retry count exceeds a maximum data retry count (e.g., 64) at block 206, this triggers roaming of the Mobile Node at block 208.

Similarly, a network device such as an Access Point typically transmits beacons so that a mobile network device associated to or in the vicinity of the Access Point knows of the existence of the network device. The Mobile Node first associates with the Access Point. The Mobile Node may then send a registration request to its Home Agent via the network device. Typically, the Mobile Node maintains a trigger counter indicating the number of consecutive beacons that have been missed (i.e., undetected) by the Mobile Node, and may therefore be ascertained as shown at block 210. When the number of beacons that have been missed exceeds the maximum number of beacons that can be missed as shown at block 212, roaming of the Mobile Node is triggered at block 214.

As another example, as the Mobile Node travels further from the antenna of the Access Point, the rate at which data is sent out by the Mobile Node decreases. Similarly, as the Mobile Node approaches the antenna of the Access Point, the rate at which data is sent out by the Mobile Node increases. This rate at which data is transmitted by the Mobile Node may be referred to as a data rate. This shift (e.g., increase or decrease) in data rate may therefore be periodically ascertained at block 216. If the data rate shift is greater than a maximum (e.g., acceptable) data rate shift at block 218, roaming is triggered at block 220.

Another roaming event may occur dependent upon the signal level of the Access Point that is detected by the Mobile Node. Specifically, the Mobile Node may be configured to detect when the signal level drops below a certain level. For instance, the Mobile Node may be configured to roam once the signal level has dropped below 50%. Thus, at periodic intervals, a signal strength may be ascertained at block 222. When the signal strength is less than the minimum acceptable signal strength at block 224, roaming is triggered at block 226.

The occurrence of a trigger event such as that described above may indicate that the Mobile Node has reached, is nearing the perimeter, or is outside of the coverage area of a particular network device (e.g., Access Point), thereby triggering roaming of the Mobile Node. Until one of these events occurs, the process continues at block 204, and the Mobile Node continues to receive packets via its current network device (e.g., Access Point).

In accordance with one aspect of the invention, the Mobile Node is speed sensitive. In other words, the speed of the Mobile Node is detected. In response, the parameters or trigger counters that are used to trigger roaming of the Mobile Node are modified in accordance with the detected speed or, alternatively, the parameters or trigger counters associated with the detected speed are ascertained.

Figure 3:
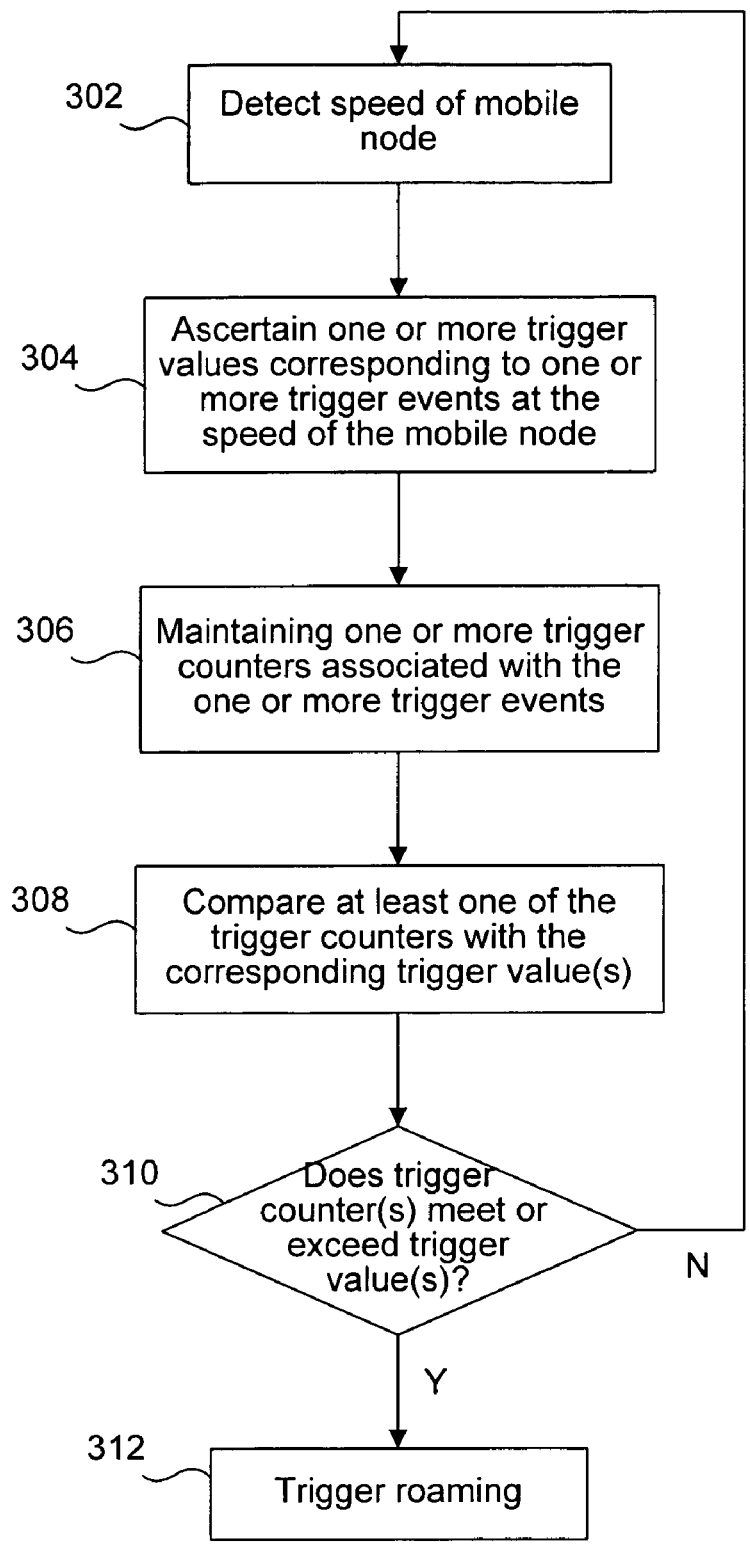
FIG. 3 is a process flow diagram illustrating a method of triggering roaming in accordance with one embodiment of the invention.

FIG. 3 is a process flow diagram illustrating a method of triggering roaming in accordance with one embodiment of the invention. As shown at block 302, the speed of the Mobile Node is detected. The speed of the Mobile Node may be detected via a Global Positioning System (GPS) or other mechanism. One or more trigger values corresponding to one or more trigger events at the speed of the Mobile Node are ascertained at block 304. For instance, the trigger events may include at least one of maximum data retry count is exceeded, maximum number of beacons missed is exceeded, data rate shift, and signal strength. The trigger values associated with the trigger events are maximum data retry count, maximum number of beacons missed, maximum data rate shift, and minimum signal strength, respectively.

Throughout the operation of the Mobile Node, the Mobile Node maintains the one or more trigger counters associated with the one or more trigger events as shown at block 306. Roaming is triggered when one of the trigger counters associated with one of the trigger events is equal to or exceeds (or is less than or equal to) one of the trigger values corresponding to the trigger event at the speed of the Mobile Node. Specifically, at least one of the trigger counters is compared with the corresponding trigger value(s) at block 308. If the trigger counter(s) meet or exceed the corresponding trigger value(s) (or is less than or equal to the corresponding trigger value(s)) at block 310, roaming is triggered at block 312. Otherwise, the process continues at block 302. The speed of the Mobile Node may be detected periodically. Moreover, the speed of the Mobile Node may be detected at a pre-configured rate or merely while the Mobile Node is in motion.

Thus, roaming is triggered when the trigger counter associated with the maximum data retry count is exceeded trigger event is equal to or exceeds the maximum data retry count trigger value. In addition, roaming is triggered when the trigger counter associated with the maximum number of beacons missed is exceeded trigger event is equal to or exceeds the maximum number of beacons missed trigger value. Similarly, roaming is triggered when the trigger counter associated with the data rate shift trigger event is equal to or exceeds the maximum data rate shift trigger value. Roaming is also triggered when the trigger counter associated with the signal strength trigger event is less than or equal to the minimum signal strength trigger value.

When roaming is triggered, the Mobile Node searches for a new Access Point and associates with it. Specifically, the Mobile Node should be within the coverage area of the new Access Point. The Mobile Node may also de-register with the previous Access Point such that the Mobile Node is no longer associated with its prior location (e.g., Access Point).

Once the Mobile Node associates with the new Access Point, it may be in a coverage area of a new Foreign Agent. In such a case, the Mobile Node may then send a registration request to its Home Agent via the new Foreign Agent in order to register with its Home Agent. The Mobile Node may also de-register with the Home Agent (e.g., via its new Foreign Agent) such that the Mobile Node is no longer associated with its prior location (e.g., Foreign Agent). In this manner, the Mobile Node may communicate to its Home Agent that it is no longer within the coverage area of the prior Foreign Agent via which the Mobile Node has registered with its Home Agent.

In accordance with one aspect of the invention, the trigger value(s) used to trigger roaming depend upon the speed of the Mobile Node. Thus, the trigger value(s) corresponding to the appropriate speed or speed range is ascertained. This may be accomplished via a look-up table (e.g., profile) or by modifying trigger value(s) by a scale factor (e.g., percentage, fraction or other numerical value) based upon the speed of the Mobile Node.

FIG. 4 is an exemplary profile or look-up table indicating maximum or minimum trigger values corresponding to various speeds or speed ranges in accordance with one embodiment of the invention. As shown, various speeds or speed ranges are identified. In this manner, the appropriate trigger value(s) may be identified at the particular speed of the Mobile Node. As shown, the maximum data retry count trigger value, maximum missed beacons trigger value, maximum data rate shift trigger value, and minimum signal strength trigger value are specified. Thus, through the identification of the appropriate column in the profile, the maximum/minimum trigger value(s) may be identified. In this manner, the value(s) that trigger roaming of a Mobile Node may be ascertained.

For instance, as shown in FIG. 4, a speed of 1.5 mph would indicate that the maximum data retry count trigger value is 8, the maximum missed beacons trigger value is 3, the maximum data rate shift trigger value is 15, and the minimum signal strength trigger value is 12.5. As shown, as the speed of the Mobile Node increases, the trigger values decrease, thereby increasing the rate at which the Mobile Node roams to a closer network device (e.g., Access Point).

In accordance with another embodiment of the invention, rather than looking up trigger values in a table, trigger values may be modified depending upon the detected speed of the Mobile Node. FIG. 5 is an exemplary profile indicating scale factors (e.g., multiplication factors) corresponding to various speeds or speed ranges, as well as trigger events, in accordance with one embodiment of the invention. As shown in this example, when the speed of the Mobile Node is 1.5 mph, the multiplication factor for the maximum data retry count trigger value is ⅔, the multiplication factor for the maximum missed beacons trigger value is ¾, the multiplication factor for the maximum data rate shift trigger value is ½, and the multiplication factor for the minimum signal strength trigger value is ½. In this example, each of the trigger values has a different multiplying factor corresponding to the corresponding trigger event at the speed of the Mobile Node. Alternatively, the trigger values at a particular speed may all be multiplied by a single multiplying factor (e.g., ½). As described above, as the speed of the Mobile Node increases, the trigger values decrease, and as the speed of the Mobile Node decreases, the trigger values increase. Thus, the multiplying factors also decrease as the speed of the Mobile Node increases, thereby decreasing the associated trigger value(s). Similarly, the multiplying factors increase as the speed of the Mobile Node decreases, thereby increasing the associated trigger value(s).

The present invention improves the operation of a mobile network device such as a Mobile Node at higher traveling speeds. This is accomplished through modifying the rate at which roaming is performed. Accordingly, roaming is performed at a higher frequency rate as the speed of the Mobile Node increases.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices.

The apparatus (e.g. Mobile Node, Access Point, Home Agent, or Foreign Agent) of this invention may be specially constructed for the required purposes, or may be a general purpose programmable machine selectively activated or reconfigured by a computer program stored in memory. The processes presented herein are not inherently related to any particular router or other apparatus. In a preferred embodiment, any of the Home and Foreign Agents of this invention may be specially configured routers such as specially configured router models 2500, 2600, 3600, 4000, 4500, 4700, 7200, and 7500 available from Cisco Systems, Inc. of San Jose, Calif. In addition, in a preferred embodiment, any of the Access Points of this invention may be specially configured routers such as specially configured router models 350, 1100, 1200 and 1400 available from Cisco Systems, Inc. of San Jose, Calif. Moreover, in a preferred embodiment, the Mobile Node of this invention may be a specially configured router such as specially configured router model 3200 available from Cisco Systems, Inc. of San Jose, Calif. A general structure for some of these machines will appear from the description given below.

Generally, the roaming technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid roaming system of this invention is preferably implemented on a general-purpose programmable machine selectively activated or reconfigured by a computer program stored in memory. Such programmable machine may be a network device designed to handle network traffic. Such network devices typically have multiple network interfaces including frame relay, ISDN, and wireless interfaces, for example. Specific examples of such network devices include routers and switches. For example, the roaming systems of this invention may be specially configured routers such as specially configured router models 350, 1100, 1200, 1400, 1600, 2500, 2600, 3200, 3600, 4500, 4700, 7200, 7500, and 12000 available from Cisco Systems, Inc. of San Jose, Calif. In an alternative embodiment, the roaming system may be implemented on a general-purpose network host machine such as a personal computer or workstation. Further, the invention may be at least partially implemented on a card (e.g., an interface card) for a network device or a general-purpose computing device.

Figure 6:
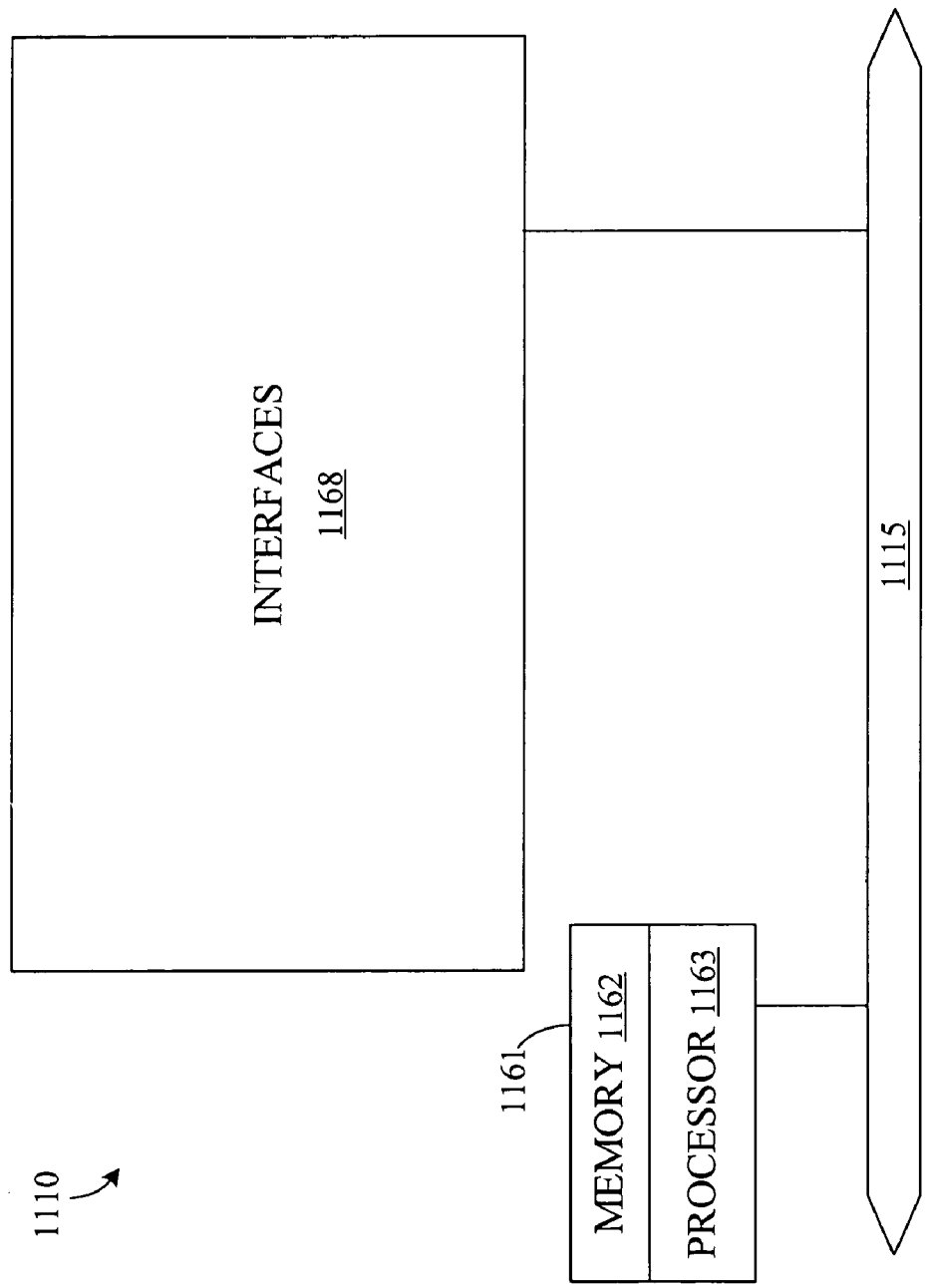
FIG. 6 is a block diagram of a network device that may be configured to implement aspects of the present invention.

Referring now to FIG. 6, a router 1110 suitable for implementing the present invention includes a master central processing unit (CPU) 1162, interfaces 1168, and a bus 1115 (e.g., a PCI bus). When acting under the control of appropriate software or firmware, the CPU 1162 is responsible for such router tasks as routing table computations and network management. It may also be responsible for updating mobility binding and visitor tables, etc. It preferably accomplishes all these functions under the control of software including an operating system (e.g., the Internetwork Operating System (IOS®) of Cisco Systems, Inc.) and any appropriate applications software. CPU 1162 may include one or more processors 1163 such as a processor from the Motorola family of microprocessors or the MIPS family of microprocessors. In an alternative embodiment, processor 1163 is specially designed hardware for controlling the operations of router 1110. In a specific embodiment, a memory 1161 (such as non-volatile RAM and/or ROM) also forms part of CPU 1162. However, there are many different ways in which memory could be coupled to the system.

The interfaces 1168 are typically provided as interface cards (sometimes referred to as "line cards"). Generally, they control the sending and receiving of data packets over the network and sometimes support other peripherals used with the router 1110. Among the interfaces that may be provided are Ethernet interfaces, frame relay interfaces, cable interfaces, DSL interfaces, token ring interfaces, wireless interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1162 to efficiently perform routing computations, network diagnostics, security functions, etc.

Although the system shown in FIG. 6 is one specific router of the present invention, it is by no means the only router architecture on which the present invention can be implemented. For example, an architecture having a single processor that handles communications as well as routing computations, etc. is often used. Further, other types of interfaces and media could also be used with the router.

Regardless of network device's configuration, it may employ one or more memories or memory modules (including memory 1161) configured to store program instructions for the general-purpose network operations and mechanisms for roaming and routing functions described herein. The program instructions may control the operation of an operating system and/or one or more applications, for example. The memory or memories may also be configured to store tables such as mobility binding, registration, and association tables, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, although the specification has described routers, other entities used to tunnel packets to nodes on remote network segments can be used as well. For example, bridges or other less intelligent packet switches may also employ the standby protocol of this invention. In addition, although the Mobile IP protocol and EEE 802.11 protocols have been described herein, subsequent versions of these protocols as well as other protocols may be implemented to support mobility of a mobile network device in a wireless network. Accordingly, the present embodiments are to be considered as illustrative and not restrictive, and the invention is not to be limited to the details given herein, but may be modified within the scope and equivalents of the appended claims.

What is claimed is:

1. A method, comprising:

detecting by a network device a speed of the network device;

ascertaining by the network device one or more threshold values corresponding to one or more trigger events and the detected speed of the network device from a profile configured at the network device, wherein the profile includes a plurality of sets of threshold values, each of the plurality of sets of threshold values including one or more threshold values corresponding to one or more trigger events, wherein each of the plurality of sets of threshold values corresponds to a different set of one or more speeds of a plurality of speeds;

ascertaining by the network device one or more trigger values associated with the one or more trigger events; and triggering roaming of the network device when one of the trigger values associated with one of the trigger events is equal to or exceeds one of the threshold values that correspond to the one of the trigger events and the detected speed of the network device;

wherein the threshold values include at least one of maximum data retry count, maximum number of beacons missed, or maximum data rate shift, wherein the threshold values do not include one or more speeds;

wherein the network device is a Mobile Node supporting Mobile IP.

2. The method as recited in claim 1, wherein the network device is a Mobile Node implemented in a 802.11 environment.

3. The method as recited in claim 1, wherein roaming is triggered when the network device has reached or is nearing a perimeter of a coverage area of an Access Point to which the network device has associated or a Foreign Agent via which the network device has registered with its Home Agent.

4. The method as recited in claim 1, wherein roaming is triggered when the network device is no longer within a coverage area of an Access Point to which the network device has associated or a Foreign Agent via which the network device has registered with its Home Agent.

5. The method as recited in claim 1, wherein the rate at which the network device roams increases as the speed of the network device increases.

6. The method as recited in claim 1, wherein the one or more threshold values decrease as the speed of the network device increases.

7. The method as recited in claim 1, wherein the trigger events include at least one of maximum data retry count is exceeded, maximum number of beacons missed is exceeded, data rate shift.

8. The method as recited in claim 1, wherein roaming is triggered when one of the trigger values associated with the maximum data retry count is exceeded trigger event is equal to or exceeds the maximum data retry count threshold value.

9. The method as recited in claim 1, wherein roaming is triggered when one of the trigger values associated with the maximum number of beacons missed is exceeded trigger event is equal to or exceeds the maximum number of beacons missed threshold value.

10. The method as recited in claim 1, wherein roaming is triggered when one of the trigger values associated with the data rate shift trigger event is equal to or exceeds the maximum data rate shift threshold value.

11. The method as recited in claim 1, wherein detecting a speed of the network device is performed using a GPS.

12. The method as recited in claim 1, wherein the network device is a Mobile Node, the method further comprising:
registering with a Home Agent via a new Foreign Agent using a new Access Point when roaming is triggered, wherein the Mobile Node is within a coverage area of the new Foreign Agent and the new Access Point.

13. The method as recited in claim 12, further comprising:
de-registering with the Home Agent via a new Foreign Agent using a new Access Point, wherein the Mobile Node is no longer within a coverage area of the previous Foreign Agent.

14. The method as recited in claim 1, wherein the network device is a Mobile Node, and wherein when roaming is triggered, the Mobile Node is no longer within a coverage area of a Foreign Agent via which the mobile node has registered with its Home Agent.

15. The method as recited in claim 1, wherein when roaming is triggered, the network device is no longer within a coverage area of an Access Point servicing the network device.

16. The method as recited in claim 1, further comprising:
modifying one or more threshold values in one of the plurality of sets of threshold values.

17. The method as recited in claim 16, wherein modifying one or more threshold values comprises:
multiplying the one or more threshold values by one or more multiplying factors, wherein each of the multiplying factors corresponds to the speed of the network device.

18. The method as recited in claim 17, wherein each of the multiplying factors decreases the one or more threshold values when the speed of the network device increases.

19. The method as recited in claim 17, wherein each of the multiplying factors increases the one or more threshold values when the speed of the network device decreases.

20. The method as recited in claim 17, further comprising:
ascertaining the multiplying factors corresponding to the speed of the network device.

21. The method as recited in claim 17, wherein multiplying comprises:
multiplying the one or more threshold values by a single multiplying factor.

22. The method as recited in claim 17, wherein multiplying comprises:
multiplying each of the threshold values by a different multiplying factor, wherein the multiplying factor corresponds to the trigger event.

23. The method as recited in claim 1, wherein the network device is a Mobile Node, the method further comprising:
registering with a Home Agent via a Foreign Agent when roaming is triggered, wherein the Mobile Node is within a coverage area of the Foreign Agent.

24. The method as recited in claim 23, further comprising:
de-registering with the Home Agent via a new Foreign Agent, wherein the Mobile Node is no longer within a coverage area of the previous Foreign Agent.

25. The method as recited in claim 1, wherein the network device is a Mobile Node, and wherein when roaming is triggered, the Mobile Node is no longer within a coverage area of a Foreign Agent via which the mobile node has registered with its Home Agent.

26. The method as recited in claim 1, wherein obtaining the one or more threshold values corresponding to one or more trigger events and the detected speed of the network device comprises:
identifying one of the plurality of sets of threshold values that corresponds to a set of one or more speeds that includes the detected speed of the network device.

27. The method as recited in claim 1, wherein each of the threshold values corresponds to a different one of the trigger events.

28. The method as recited in claim 1, wherein the threshold values include a maximum data retry count, maximum number of beacons missed, and maximum data rate shift.

29. The method as recited in claim 1, wherein the threshold values consist of maximum data retry count, maximum number of beacons missed, and maximum data rate shift.

30. The method as recited in claim 1, wherein the trigger events include maximum data retry count is exceeded, maximum number of beacons missed is exceeded, and data rate shift.

31. The method as recited in claim 1, wherein the trigger events consist of maximum data retry count is exceeded, maximum number of beacons missed is exceeded, and data rate shift.

32. The method as recited in claim 1, wherein each of the plurality of sets of threshold values corresponds to a different set of two or more speeds of a plurality of speeds.

33. A method, comprising:
detecting by a network device a speed of the network device;
ascertaining by the network device one or more threshold values corresponding to one or more trigger events and the detected speed of the network device from a profile configured at the network device, wherein the profile includes a plurality of sets of threshold values, each of the plurality of sets of threshold values including one or more threshold values corresponding to one or more trigger events, wherein each of the plurality of sets of threshold values corresponds to but does not include a different set of one or more speeds of a plurality of speeds, wherein the threshold values include minimum signal strength and wherein the trigger events include signal strength;
ascertaining by the network device one or more trigger values associated with the one or more trigger events such that a signal strength is ascertained; and
triggering roaming of the network device when the ascertained signal strength is less than the minimum signal strength threshold value, the minimum signal strength threshold value corresponding to the detected speed of the network device;
wherein the network device is a Mobile Node supporting Mobile IP.

34. The method as recited in claim 33, wherein the threshold values consist of minimum signal strength.

35. A non-transitory computer-readable medium storing thereon computer-readable instructions, comprising:
   instructions for detecting a speed of a network device;
   instructions for ascertaining one or more threshold values corresponding to one or more trigger events and the detected speed of the network device from a profile configured at the network device, wherein the profile includes a plurality of sets of threshold values, each of the plurality of sets of threshold values including one or more threshold values corresponding to one or more trigger events, wherein each of the plurality of sets of threshold values corresponds to but does not include a different set of one or more speeds of a plurality of speeds;
   instructions for ascertaining one or more trigger values associated with the one or more trigger events; and
   instructions for triggering roaming when one of the trigger values associated with one of the trigger events is equal to or exceeds one of the threshold values that correspond to the one of the trigger events and the detected speed of the network device;
   wherein the threshold values include at least one of maximum data retry count, maximum number of beacons missed, or maximum data rate shift;
   wherein the network device is a Mobile Node supporting Mobile IP.

36. An apparatus, comprising:
   means for detecting a speed of the apparatus;
   means for ascertaining one or more threshold values corresponding to one or more trigger events and the detected speed of the apparatus from a profile configured at the apparatus, wherein the profile includes a plurality of sets of threshold values, each of the plurality of sets of threshold values including one or more threshold values corresponding to one or more trigger events, wherein each of the plurality of sets of threshold values corresponds to a different set of one or more speeds of a plurality of speeds;
   means for ascertaining one or more trigger values associated with the one or more trigger events; and
   means for triggering roaming when one of the trigger values associated with one of the trigger events is equal to or exceeds one of the threshold values that correspond to the one of the trigger events and the detected speed of the apparatus;
   wherein the threshold values include at least one of maximum data retry count, maximum number of beacons missed, or maximum data rate shift, wherein the threshold values do not include;
   wherein the network device is a Mobile Node supporting Mobile IP.

37. An apparatus, comprising:
   a processor; and
   a memory, at least one of the processor or the memory:
   detecting a speed of the apparatus;
   ascertaining one or more threshold values corresponding to one or more trigger events and the detected speed of the apparatus from a profile configured at the apparatus, wherein the profile includes a plurality of sets of threshold values, each of the plurality of sets of threshold values including one or more threshold values corresponding to one or more trigger events, wherein each of the plurality of sets of threshold values corresponds to but does not include a different set of one or more speeds of a plurality of speeds;
   ascertaining one or more trigger values associated with the one or more trigger events; and
   triggering roaming when one of the trigger values associated with one of the trigger events is equal to or exceeds one of the threshold values that correspond to the one of the trigger events and the detected speed of the apparatus;
   wherein the threshold values include at least one of maximum data retry count, maximum number of beacons missed, or maximum data rate shift;
   wherein the network device is a Mobile Node supporting Mobile IP.

38. A network device, comprising:
   a processor; and
   a memory, at least one of the processor or the memory being adapted for:
   detecting a speed of a network device;
   obtaining one or more threshold values corresponding to the detected speed of the network device from a profile configured at the network device, wherein the profile includes a plurality of sets of threshold values, each of the plurality of sets of threshold values including one or more threshold values, wherein each of the plurality of sets of threshold values corresponds to a different set of one or more speeds of a plurality of speeds;
   ascertaining one or more trigger values associated with one or more trigger events; and
   triggering roaming when one of the trigger values associated with one of the trigger events is equal to or exceeds one of the threshold values that correspond to the one of the detected speeds of the network device;
   wherein the threshold values include at least one of maximum data retry count, maximum number of beacons missed, or maximum data rate shift, wherein the threshold values do not include one or more speeds;
   wherein the network device is a Mobile Node supporting Mobile IP.

39. An apparatus, comprising:
   a processor; and
   a memory, at least one of the processor or the memory being adapted for:
   detecting by a network device a speed of the network device;
   ascertaining by the network device one or more threshold values corresponding to one or more trigger events and the detected speed of the network device from a profile configured at the network device, wherein the profile includes a plurality of sets of threshold values, each of the plurality of sets of threshold values including one or more threshold values corresponding to one or more trigger events, wherein each of the plurality of sets of threshold values corresponds to a different set of one or more speeds of a plurality of speeds, wherein the threshold values include minimum signal strength and wherein the trigger events include signal strength, and wherein the threshold values do not include one or more speeds;
   ascertaining by the network device one or more trigger values associated with the one or more trigger events such that a signal strength is ascertained; and
   triggering roaming of the network device when the ascertained signal strength is less than the minimum signal strength threshold value, the minimum signal strength threshold value corresponding to the detected speed of the network device;
   wherein the network device is a Mobile Node supporting Mobile IP.

* * * * *